United States Patent
Dack et al.

(10) Patent No.: US 10,769,856 B2
(45) Date of Patent: *Sep. 8, 2020

(54) USER-HEIGHT-BASED RENDERING SYSTEM FOR AUGMENTED REALITY OBJECTS

(71) Applicant: Microsoft Technology Licensing, LLC, Redmond, WA (US)

(72) Inventors: James Gerard Dack, Seattle, WA (US); Jeffrey Alan Kohler, Redmond, WA (US); Shawn Crispin Wright, Sammamish, WA (US); Anthony James Ambrus, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,331

(22) Filed: Nov. 19, 2018

(65) Prior Publication Data
US 2019/0088029 A1    Mar. 21, 2019

Related U.S. Application Data

(63) Continuation of application No. 15/182,490, filed on Jun. 14, 2016, now Pat. No. 10,134,190.

(51) Int. Cl.
*G06T 19/00*    (2011.01)
*G06F 3/01*     (2006.01)
*G06F 1/16*     (2006.01)

(52) U.S. Cl.
CPC ............ *G06T 19/006* (2013.01); *G06F 1/163* (2013.01); *G06F 3/011* (2013.01)

(58) Field of Classification Search
None
See application file for complete search history.

(56) References Cited

U.S. PATENT DOCUMENTS

| 10,282,914 B1* | 5/2019 | Tran ........................ G06T 17/00 |
| 2012/0052942 A1* | 3/2012 | Esaki .................... A63F 13/213 463/31 |
| 2013/0314398 A1* | 11/2013 | Coates .................... G09G 5/14 345/419 |
| 2013/0328927 A1* | 12/2013 | Mount .................. G06T 19/006 345/633 |
| 2017/0205892 A1* | 7/2017 | Petrovskaya ......... G06T 19/006 |
| 2017/0278306 A1* | 9/2017 | Rico .................... G06T 19/006 |

* cited by examiner

*Primary Examiner* — Yi Wang
(74) *Attorney, Agent, or Firm* — Alleman Hall Creasman & Tuttle LLP

(57) ABSTRACT

In various embodiments, methods and systems for rendering augmented reality objects based on user heights are provided. Height data of a user of an augmented reality device can be determined. The height data relates to a viewing perspective from an eye level of the user. Placement data for a first augmented reality object is generated based on the user height data. The first augmented reality object is rendered based on the user height data, and a second augmented reality object is excluded from rendering based on the user height data.

17 Claims, 8 Drawing Sheets

US 10,769,856 B2

USER-HEIGHT-BASED RENDERING SYSTEM FOR AUGMENTED REALITY OBJECTS

CROSS REFERENCE TO RELATED APPLICATIONS

This application is a continuation of U.S. patent application Ser. No. 15/182,490, filed Jun. 14, 2016, the entire contents of which is hereby incorporated herein by reference for all purposes.

BACKGROUND

Modern technology has led to the development of augmented reality devices. Augment-reality devices can support direct or indirect views of a real world environment along with augmented reality objects digitally projected on the real world scene. Augmented reality devices can also operate as scene-aware devices that have an understanding of a real world environment defined as an augmented reality environment (i.e., virtual environment) supported by the augmented reality device. An augmented reality device can support presentation the of the augmented reality objects, which are virtualized entities (e.g., holographic content or mixed-reality content), that are rendered for a user associated with the augmented reality device. The augmented reality objects can be rendered based on the real world environment captured by the augmented reality device.

SUMMARY

Embodiments described herein provide methods and systems for rendering augmented reality objects based on user heights. Augmented reality objects or mixed reality objects can be generated using augmented reality devices. Augmented reality objects can specifically be rendered in a real world environment based on a height of a user of the augmented reality device. In this regard, rendering of the augmented reality object is personalized for each specific user of the augmented reality device, even in shared experiences, where other users are observing the same augmented reality object. In operation, height data of a user of an augmented reality device can be determined. The height data is associated with a viewing perspective from an eye level of a user of the augmented reality device. Placement data for an augmented reality object is generated. The placement data is generated based on a constraint configuration that is associated with the augmented reality object for user-height-based rendering. The constraint configuration includes rules that support generating placement data for rendering augmented reality objects based on the user height data. The augmented reality object is rendered based on the placement data.

In one embodiment, a first set of augmented reality objects and a second set of augmented reality objects are rendered for a user via the augmented reality device. The first set of augmented reality objects are rendered based on the height of the user while the second set of augmented reality objects are not rendered based on the height of the user. As such, rendering augmented reality objects is performed selectively, based at least in part on a constraint configuration associated with a particular augmented reality object.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
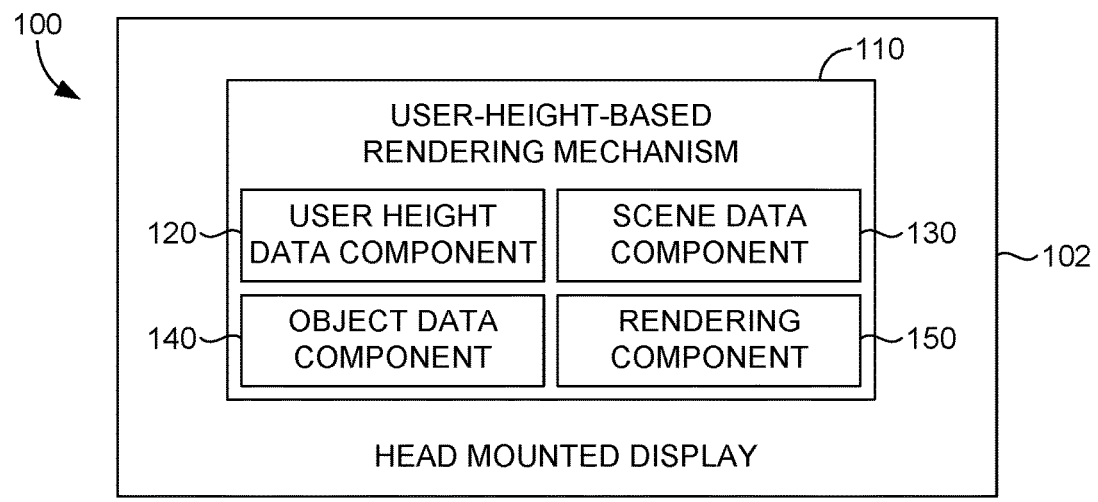
FIG. 1 is a schematic showing an exemplary user-height-based rendering system, in accordance with embodiments of the present invention.

Modern technology has led to the development of augmented reality devices. Augment-reality devices can support direct or indirect views of a real world environment along with augmented reality objects digitally projected on the real world scene. In this regard, augmented reality devices can also operate as scene-aware devices that have an understanding of a real world environment defined as an augmented reality environment (i.e., virtual environment) supported by the augmented reality device.

An augmented reality device can support the presentation of the augmented reality objects, which are virtualized entities (e.g., holographic content or mixed-reality content), that are rendered for a user associated with the augmented reality device. The augmented reality objects can be rendered based on the real world environment captured by the augmented reality device. Understanding of an environment can be based on several different techniques that provide the augmented reality device with information of the environment. For example, an environment may be scanned in real-time and a mesh representation of the environment can be dynamically generated to provide the augmented reality device with information on the environment.

Augmented reality devices can support augmented reality or mixed-reality experiences. User experiences that include navigating through real world environments based on augmented reality objects or viewing augmented reality objects ("AR objects") in combination with the real world environment. AR objects can include different types of computer sensory input (e.g., sound, video, graphics, GPS data) combined with the real world, for example, a hologram catalogue or virtual images of 3D objects that can be placed and scaled around a user an project in the real world for a user to observer an augmented reality image or experience. AR objects can be used in a variety of different implementations (e.g., video games, entertainment, productivity tools, etc.) as entities that have functionality based on preconfigured instructions or from actuators from the user or the augment reality device. For example, navigation AR objects or waypoints in a mixed-reality tour of a physical environment can communicate instructions to a user during a tour on how to walkthrough the mixed-reality tour environment. Also, a user can observe or interact with animated objects that are presented to the user. Navigation AR objects or animation objects may be presented based on other objects in the real world environment as captured by the augmented reality device.

Augmented reality objects that are generated for multiple users can, however, present several challenges because of the variability in user heights. Some users may not be able to get an ideal viewing perspective on augmented reality objects in an environment if a predefined viewing perspective is used for all users. Users may experience physical discomfort if they are required to move their heads often to find the focus of the augmented reality object in their environment. The enjoyment of the experience can be diminished when the augmented reality objects cannot be seen from the particular user's own ideal viewing perspective. Additionally, simply moving augmented reality objects to the eye level of a viewer may not be enough to address this issue. In particular, while moving the augmented reality objects to eye level may alleviate discomfort and focus issues, projecting augmented reality objects based on landlocking can be affected. In particular, raising an augmented reality object to eye level can break the world locked aspect and potential real-object augmentation of the augmented reality experience; in this regard, the adjustment of the augmented reality object within the constraints of the real world environment or an initial placement configuration becomes a factor.

Embodiments of the present invention provide simple and efficient methods and systems for rendering augmented reality objects based on user heights. User height data associated with a viewing perspective from an eye level of a user can be determined. The user height data can be used to generate placement data for rendering augmented reality objects based on the height of the user. An augmented reality object can be associated with rules (e.g., a constraint configuration) that instruct on how a particular augmented reality object should be processed based on height. The constraint configuration can define rules that support projecting an augmented reality object consistently with real world environment constraints. By way of example, in a mixed-reality tour environment, mixed-reality content can be authored to be adjusted to fit with the comfort zone of a user regardless of the height of the user. The user's height can be determined based on several different techniques (e.g., detecting a distance from the floor to a head position of the user wearing a head mounted display device). The mixed-reality content can be a free floating waypoint which helps the user navigate the environment, where the mixed-reality content is rendered at an ideal viewing perspective of the user. Waypoint (e.g., directional landmark) can refer to an augmented reality object that operates as a reference in the real world environment for purposes of navigation. Other augmented reality content can be docked or landlocked to real world objects. Animated augmented reality objects (e.g., rotating objects) can also be animated to provide a correct height-based perspective to the user. In this regard, regardless of the user's height, the augmented reality content can be viewed from a personalized viewing perspective.

With reference to FIG. 1, embodiments of the present disclosure can be discussed with reference to an exemplary user-height-based rendering system 100. For illustration purposes, the augmented reality device is an exemplary head mounted display (HMD) 102 device, but other types of augmented reality device are contemplated with embodiments of the present disclosure. The HMD 102 includes several components including a user-height-based rendering mechanism 110 having a user height data component 120, a scene data component 130, and object component 140, and a rendering component 150. The HMD 102 can be configured to capture the real world environment. The HMD 102 (e.g., via the scene data component 120) can include a depth camera and sensors that support understanding elements of a scene or environment, for example, generating a 3-D mesh representation of an environment or scene to support the user-height-based rendering mechanism 110. A mechanism as used herein refers to any device, process, or service or combination thereof. A mechanism may be implemented using components as hardware, software, firmware, a special-purpose device, or any combination thereof. A mechanism may be integrated into a single device or it may be distributed over multiple devices. The various components of a mechanism may be co-located or distributed. The mechanism may be formed from other mechanisms and components thereof. The components facilitate rendering augmented reality object based on user height for augmented reality devices.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user height data component 120 is responsible for determining a height of a user. The user can be the user associated with the HMD 102. For example, the user can wear the HMD 102 that is configured to render augmented reality objects in a scene. The height of the user can advantageously refer to a height that is defined from the floor to an eye level of the user. In this regard, the height may not be an exact height of the user but rather an estimated height of an eye viewing level or perspective of the user of the augmented reality device. The user height data can also be captured based on height range levels mappings. A height data range level can be a configuration for managing several user heights or eye levels in combination. A height data range level can be associated with or mapped to several different user heights or eye level heights consistently processing all the identified user heights at the level. For example, a first height range level can be 5 feet to 5 feet 5 inches and a second height range level can be 5 feet 6 inches to 6 feet, and so on, where each range level is processed consistently for the same constraints for viewing augmented reality objects at that eye level. In some embodiments, the user can also manually enter their height from which an eye level for rendering augmented reality objects is automatically determined.

User height data can be determined using cameras or sensors associated with the HMD 102 based on measurements associated with eye level of the user. For example, for a user wears the HMD 102 having sensors that detect the user's eyes in relation to the floor of a real world environment. Determining the user height data can also be part of a calibration interface that is performed based in part on feedback and actions performed by the user. Other variations and combinations for determining user height data and managing groupings of heights of users based on range levels are contemplated with embodiments described herein. The user height data can be processed based on constraint configuration rules of augmented reality objects such that augmented reality objects are rendered in a scene based on the user height data.

The scene data component 130 is responsible for providing or capturing scene data where the augmented reality objects are displayed. Scene data can be preconfigured into the augmented reality user-height-based rendering mechanism. The scene data can include portions of the real world that are captured into a digital representation (e.g., 3D mesh) so that the augmented reality objects can be rendered in association with the scene data. For example, preconfigured scene data may be captured for a mixed reality tour experience where hallways, tables, windows and other real world objects are captured and augmented reality objects are digitally projected or rendered in the hallways, on the tables, and constructively through a window for an immersive mixed-reality viewing experience.

Scene data may be also captured in real-time. The scene data component 130 can include one or more cameras that support functionality that is directed to capturing a real world environment. The scene data can identify attributes of the scene elements within the scene, for example, the scene data may identify surfaces, walls and furniture to help determine objects in the real world that can be used as landlocked objects for augmented reality objects. Other types of detectable objects within a scene can further be identified for rendering augmented reality object. For example, machine-readable codes, QR codes, and poster tracking can offer alternative detectable object within the real world environment for projecting holographic content.

Different types of cameras and methods of augmented reality devices for capturing and generating representations and providing information about environments are contemplated with embodiments described herein. In some embodiments, scene data can also be captured based on a combination of preconfigured data and real-time data. As such, even though an existing representation of the scene may exist, the scene-aware device can further generate scene data that is used in combination with the preconfigured scene data. The scene data component 130 is responsible for communicating the scene data. Scene data can be communicated to the object data component 140 and processed via the object component 140 and the rendering component 150 that reference the scene data for digitally projecting augmented reality objects based on height, as discussed herein in more detail. Other variations and combinations of capturing and representing scene information in the form of scene data and communicating scene data are contemplated with embodiments described herein. The scene data and user height data individually or in combination can be processed based on constraints associated with augmented reality objects to render the augmented reality objects.

The object data component 140 is responsible for providing objects that are displayed as augmented reality objects. The object data component 140 can also be responsible for managing constraints configurations associated with augmented reality objects. Constraint configurations refer to rules for rendering augmented reality objects. The rules can specifically include rules for rendering the augmented reality objects based on user height or alternatively based on user height and scene data. At a high level, configuration constraint rules can include rules that instruct on whether an object is rendered based on user height data, rules that instruct on attributes of an augmented reality object to be adjusted based on user height data; rules that instruct on scene data to be used for rendering based on user height data, rules that instruct on additional objects and elements that accommodate the impact of user height data on rendering, and rules that instruct on how augmented reality objects should be rendered in shared experiences.

The object data component 140 can manage and facilitate enforcing different types of rules of a constraint configuration for augmented reality objects. Constraint configurations can be defined for whether or not an augmented reality object is rendered based on user height data. It is contemplated that a portion of augmented reality objects rendered on a real world scene may be rendered without referencing user height data, while another portion of augmented reality objects are rendered based on user height data. The constraint configuration can primarily indicate that user height data should adjust the displayed height of an augmented-reality object but further in combination or independently adjust scale, size and rotation and rotation offset of the augmented-reality object. Further, the actual height where an object is rendered may remain the same, but the object may simply be scaled or rotated based on user height data. It is contemplated that a default or initial placement can be defined for an augmented reality object in the real world environment. For example, the default placement can be associated with default placement data. The constraint configuration can include a rule that defines default constraint elements (e.g., the coordinates, parameters, and scene data) for the default placement data. The object data component can then generate new placement data based on the user height and the default placement data. The new placement data, based on user height data, adjusts the augmented reality object within the default constraint elements—coordinates, parameters and scene data, of the default placement data. In this regard, the default placement data can advantageously define a reference point for sizing, scaling, rotating, elevating or lowering the augmented reality object to maintain real world lock aspects and augmentation based on user height. As such, the generated placement data can include coordinates for rendering an object where the coordinates define a change in a height location for rendering the object but also scaling, sizing and rotating the object to accommodate height differences between users.

The constraint configuration can further indicate whether scene data in addition to user height data should be referenced when rendering an augmented reality object. Scene data can include coordinates for a real world environment that are identified and located (e.g., land-locking augmented reality object) for rendering augmented reality objects. In one example, an augmented reality object can be an animated sequence that is displayed through a real world window to create an effect of augmented reality object being viewed through the window. In this regard, the constraint configuration can indicate that scene data should be referenced for displaying the animated sequence based on the user height data. As discussed below, constraint configurations can also identify additional objects and or elements that are further defined to accommodate user height data. When the constraint configuration indicates the additional objects and elements, the object data component generates placement data based on the additional objects and elements.

The constraint configuration may also include a rule that identifies additional objects or elements that are referenced and used for accommodating rendering the augmented reality objects based on user height data. Additional objects and elements can be associated with supplemental programming and instructions for accommodating different user height data. By way of example, for users 6 feet tall and over, additional objects (e.g., objects in a peripheral view) and elements (e.g., timing for animated sequences) can be defined to accommodate their corresponding viewing scope, eye level, and viewing perspective. In particular, viewing perspectives can specifically be impacted when augmented reality objects are rotated or animated. For example, augmented reality objects can be rotated from an out-of-view position to an in-view position. As such, the rotation offset can be an element in a constraint configuration, such that, an augmented reality object rendered based on height is rotated appropriately, in particular, to maintain a real world lock or a real-world object augmentation. Instructions, including additional objects and elements, for accommodating rotating objects based on user height data can be included in a constraint configuration. By way of example, if a viewing experience includes an object emerging through a window from a bottom angle to a top angle, with such animation occurring at a predetermined time, the objects and timing for the viewing experience can be defined based on the height of the user. Additional objects and elements can be information and metadata that is identified and retrieved from a constraint configuration associated with an augmented reality object so that the augmented reality object is digitally projected based on a corresponding height of a user observing the object.

The constraint configuration can also include rules for shared viewing experiences. Shared viewing experiences can refer to mixed-reality content or holographic content that can be displayed to two or more users. For example, an augmented reality-based touring experience of a real world environment can include a number of mixed-reality objects that are rendered for several users the same time. The constraint configuration rule for shared experience can include rules for managing content for shared viewing experiences. For example, some content for a shared experience can be personalized for the user height and other content may not be personalized for the user height. Further, mixed-reality content personalized for a first user height may be viewed by a second user at the first user height. As such, the mixed-reality content is personalized and rendered at a height of the first user, but it is not then further rendered at a different height for a second user observing the content in a shared experience scenario.

Additional examples can include, constraint configurations including a rule having instructions on a distributed implementation for accommodating user height. The instructions for distributed implementations can include how and where content can be retrieved. Content processed from a remote location (e.g., a centralized server) can be content that is not further processed for personalization based on user height, while content generated and or processed locally can be mixed-reality content rendered based on user height. It is contemplated that constraint configurations can provide rules having instructions in a variety of different variations and combinations of the exemplary contexts of augmented reality experiences described above.

The object data component 140 is responsible for generating placement data for the augmented reality data object. The placement data refers to positioning information (e.g., coordinates within the real world environment based on the augmented reality representation) for rendering the augmented reality object within a real world environment or scene. For example, coordinates may be identified in a scene for rendering the particular augmented reality object. In particular, the placement data can reference the scene data to identify relative positions within the scene for rendering the augmented reality object. The generated placement data can include coordinates for rendering an object where the coordinates not only define a change in a height location for rendering the object but also scaling and size of the object to further accommodate height differences between users. The object data component 140 specifically generates the augmented reality based on a constraint configuration that includes rules for rendering the augmented reality object based on user height data. For example, the object data component identifies the augmented reality object to be displayed, references a constraint configuration associated with the augmented reality objects, and generates placement data for the augmented reality object. The placement data is communicated to the rendering component 150 to then render or project the augmented reality objects.

The rendering component 140 is responsible for rendering objects that are rendered as part of an augmented reality experience. The rendering component can be include and operate with additional components such as lenses and a light engine for projecting the augmented reality objects or images in the real world environment. The rendering component 140 can access the augmented reality objects and placement data to appropriately render the augmented reality objects based on the height of the user. In one embodiment, a calibration interface can be supported via the rendering component 140. The rendering component 140 can operate to present an interface to receive adjustment data associated with placement data and then render the augmented reality object based on the adjustment data. The rendering component 140 can then store the adjustment data, for adjusting, based on the adjustment data, subsequent placement data for augmented reality objects. The adjustment data can also be sent to the object data component to automatically factor the adjustment data into the process of generating the placement data.

Figures 2A, 2B:
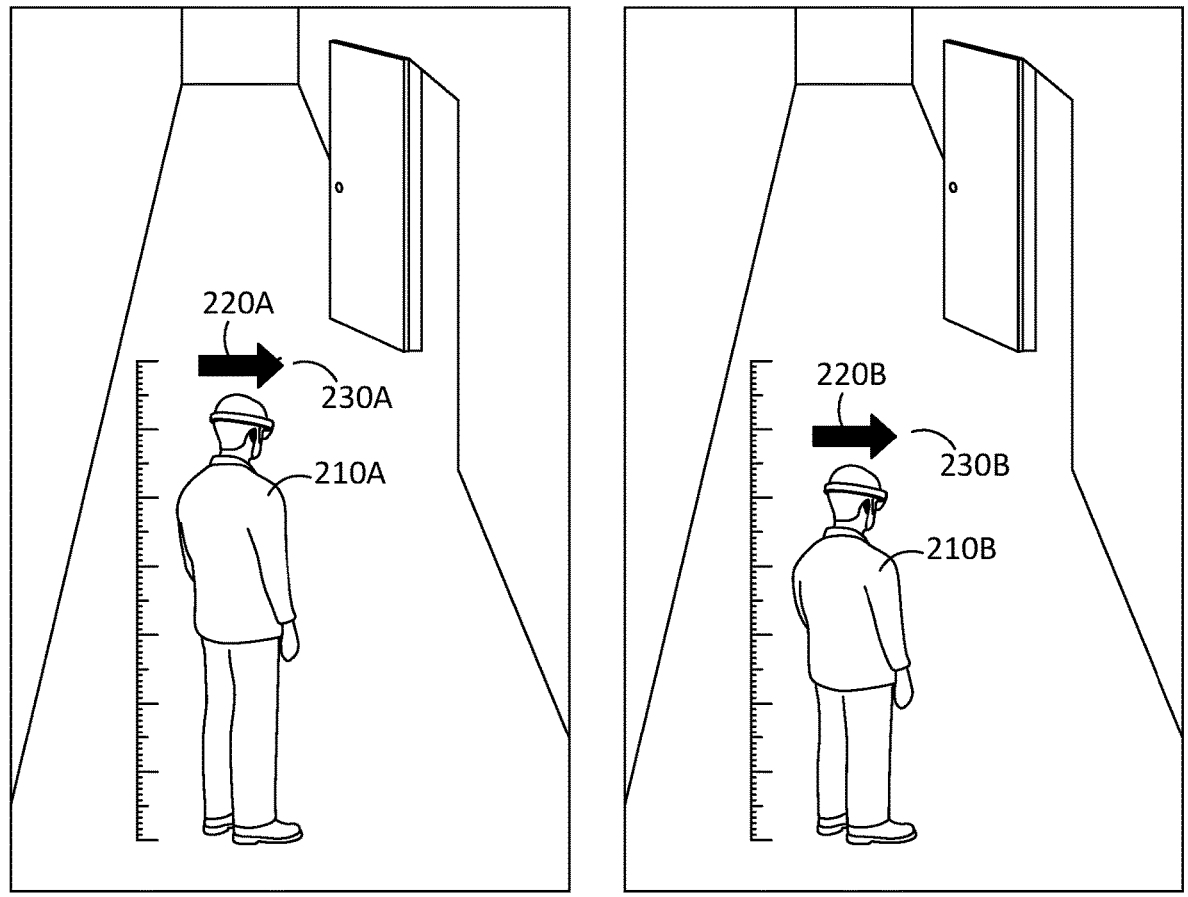
FIGS. 2A-2B are illustrations of an exemplary implementation of user-height-based rendering of augmented reality objects, in accordance with embodiments of the present invention.

With reference to supplemental figures, several illustrations of exemplary implementations of user-height-based rendering of augmented reality objects, in accordance with embodiments of the present invention, are provided. FIGS. 2A and 2B depict an augmented reality tour experience with waypoints that are projected based on user heights for users wearing an HMD. FIG. 2A includes a first user 210A traversing the real world environment based on a first waypoint 220A at a first height 230B. FIG. 2B includes a second user 210B traversing the real world environment based on a second waypoint 220B at a second height 230B. Height 230A is different from height 230B. As discussed, the heights at which the waypoints are rendered are based on user height data. As shown, the first user 210B is taller than the second user 210B, as such, the first waypoint 220A is rendered at a higher height than the second waypoint 220B.

Figure 3B:
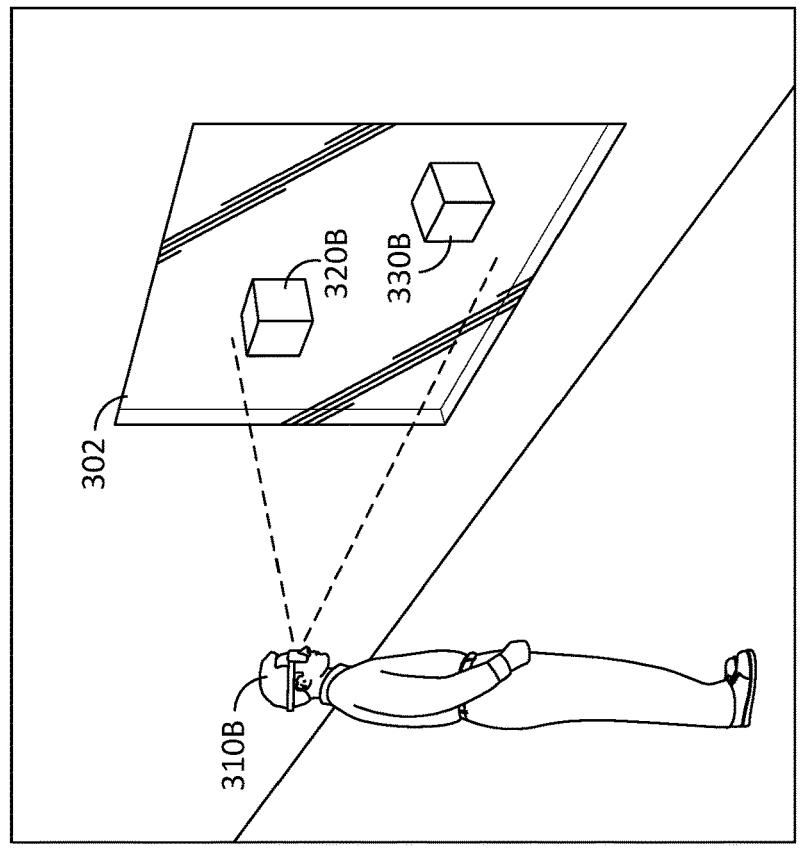
FIGS. 3A-3B are illustrations of an exemplary implementation of user-height-based rendering of augmented reality objects, in accordance with embodiments of the present invention.
Figure 3A:
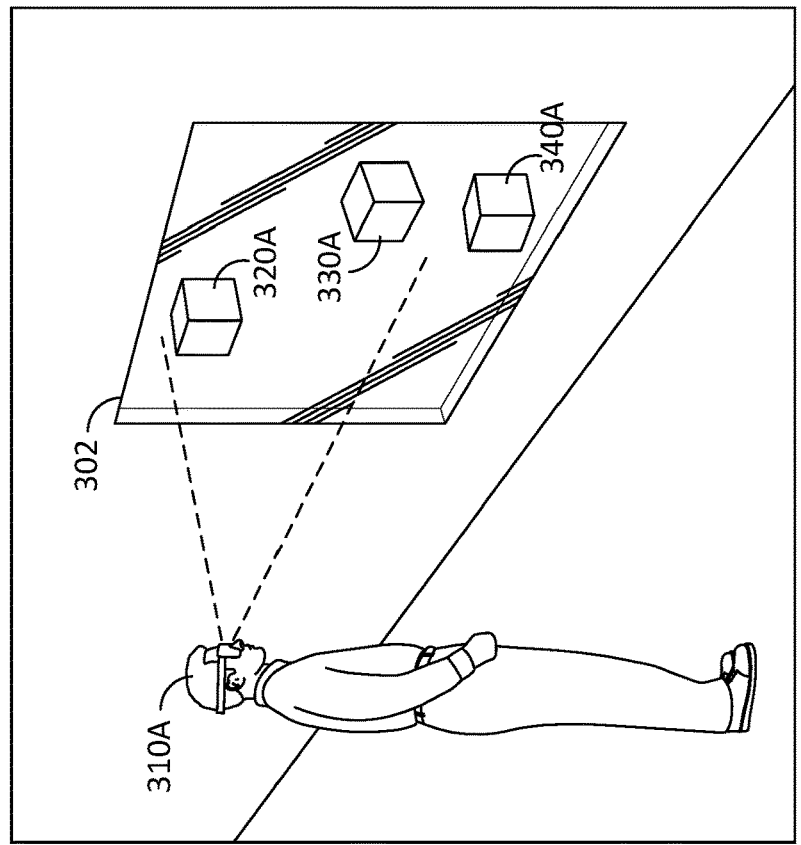

FIGS. 3A and 3B depict augmented reality objects that are rendered based on user height data and scene data. In particular, the window 302 is a real world object which as a reference point for rendering the augmented reality objects. The augmented reality objects can be static objects or dynamic objects (e.g., an animation sequence). As shown, the first user 310A is taller than the second user 310B. In this regard, projecting the holographic content 320A and 330A is executed differently from the holographic content 320B and 330A. In particular, holographic content 320A and 330A are rendered at a different higher height than holographic content 320B and 330B. As discussed above, the objects can be associated with constraint configurations that indicate additional objects or elements to accommodate for user height data. In this case, the holographic content 320A and 330A is associated with additional object 340A that is rendered for the first user 310A and not for second user 310B to accommodate the taller user's viewing perspective.

Figure 4A:
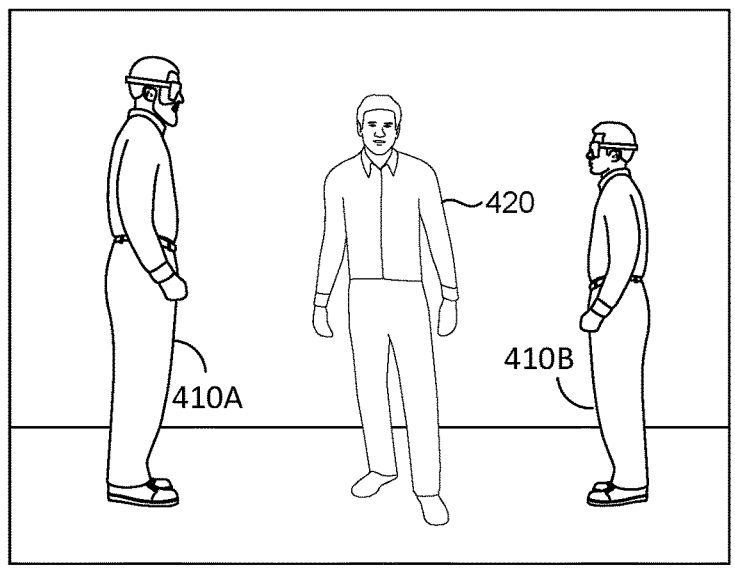
FIGS. 4A-4C are illustrations of exemplary implementations of user-height-based rendering of augmented reality objects, in accordance with embodiments of the present invention.
Figure 4B:
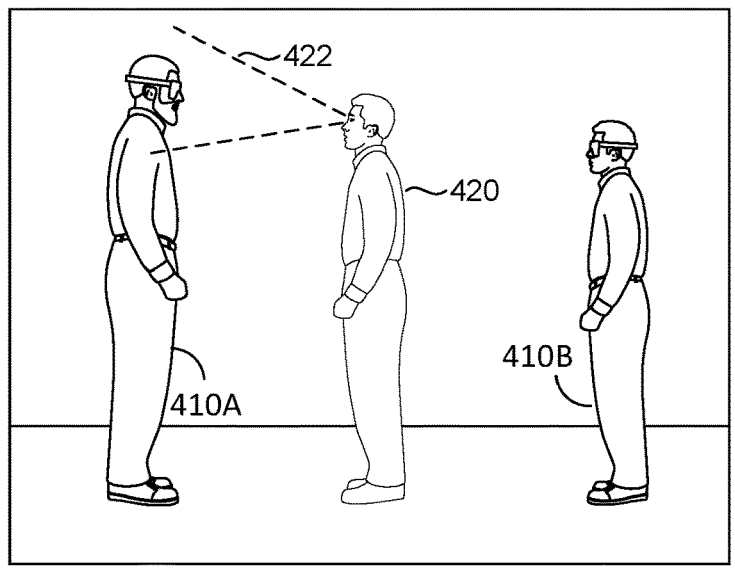
Figure 4C:
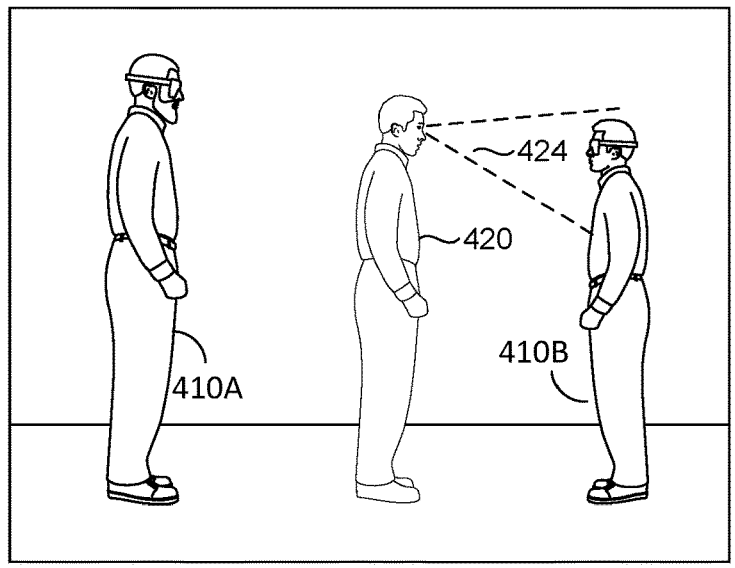

FIGS. 4A, 4B and 4C depict an animated augmented reality object that is rendered and animated based on user height. In particular, as shown in FIG. 4A, the hologram 420 is an augmented reality object that is animated to interact with users, first user 410A and second user 410B in a real world environment. The first user 410A is taller than the second user 410B. As shown in FIG. 4B, the hologram 420 interacts with the first user 410A and the hologram 420 is animated to look up 422 at the first user 410A based on the user height data. In FIG. 4C, the hologram 420 interacts with the second user 410B and the hologram 420 is animated to look down 424 at the user 410B based on the user height data. FIGS. 4A, 4B, and 4C are also exemplary illustrations of a shared experience where two user are observing the same augmented reality object, but the object, based on constraint configuration can be configured to operate as needed, and in particular be rendered based on user height data.

Figure 5:
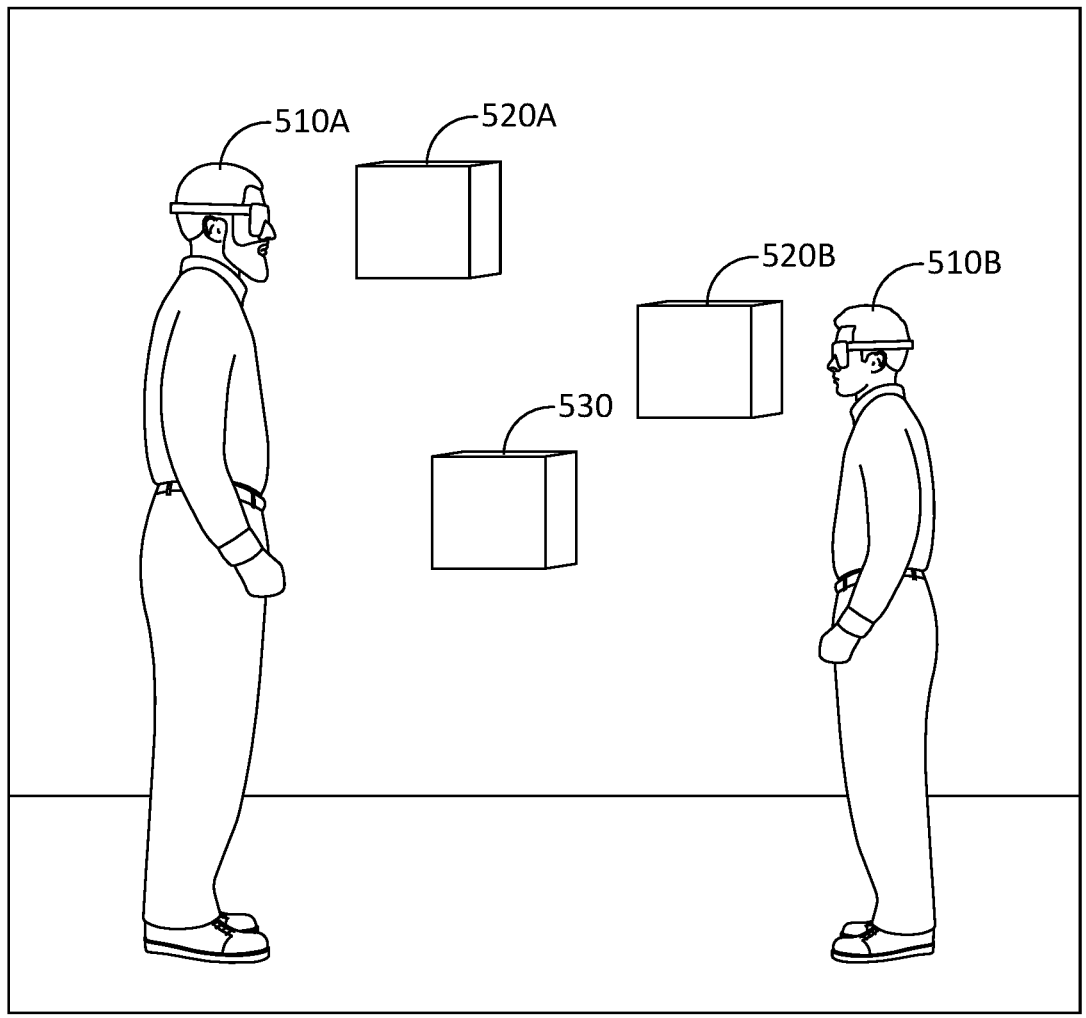
FIG. 5 is an illustration of an exemplary implementation of user-height-based rendering of augmented reality objects, in accordance with embodiments of the present invention.

FIG. 5 depicts another exemplary shared experience with augmented reality objects in accordance with embodiments described herein. The object 520A is rendered based on height data for the first user 510A and the object 520B is rendered based on height data for the second user 510B. Further, the first user 510A can see the object 520B at the height at which it is rendered for the second user 510B and the second user can see the object 520A at the height at which it is rendered for the first user 510A. The constraint configurations as discussed above can specifically include rules that instruct on shared experiences where objects are rendered differently for different users based on user height data. The object 530 can be excluded from being rendered based on height data. As such, both the first user 510A and the second user 510B view the object 530 at the same height. It may be possible to render the object 530 at a predetermined height or an average height between a set of users observing the object 530.

Figure 6:
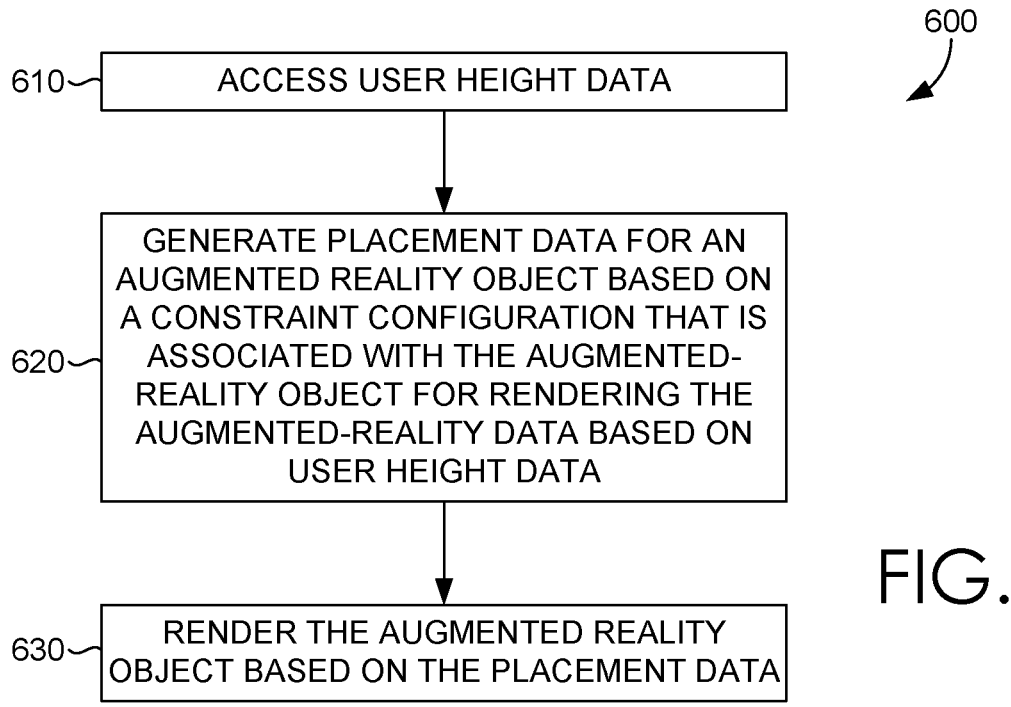
FIG. 6 is a flow diagram showing a method for user-height-based rendering of augmented reality objects in accordance with embodiments of the present invention.

With reference to FIG. 6, a method for rendering augmented reality objects based on user height is provided. Initially at block 610 user height data is accessed. The user height data component 120 can be responsible for capturing and providing user height data. The height data is associated with a viewing perspective from an eye level of a user of a scene-aware device. The user height can be mapped to one of a plurality of height ranges. The height range supports processing at least two heights in combination with each other. For example, height ranges can be in 4 inch increments such that users within 4 inches each other's heights are shown the augmented reality objects at the same height.

At block 620, the placement data for an augmented reality object is generated. The object component 130 can be responsible for generating the placement data. The placement data refers to positioning information (e.g., coordinates associated with an environment for rendering the augmented reality object). The placement data can be based on a constraint configuration associated with the augmented reality object. The constraint configuration includes rules that instruct on generating placement data for rendering augment-reality objects based on user height data. The constraint configuration can include augmented reality objects that are included, and exclude from user-height-based rendering, additional object or elements, an animation rules, and rotation rules to accommodate user height data during rendering. At block 630, the augmented reality object is rendered based on the placement data. Upon rendering the augmented reality object the user observes the augmented reality object at a view perspective that is associated with their particular height data.

Figure 7:
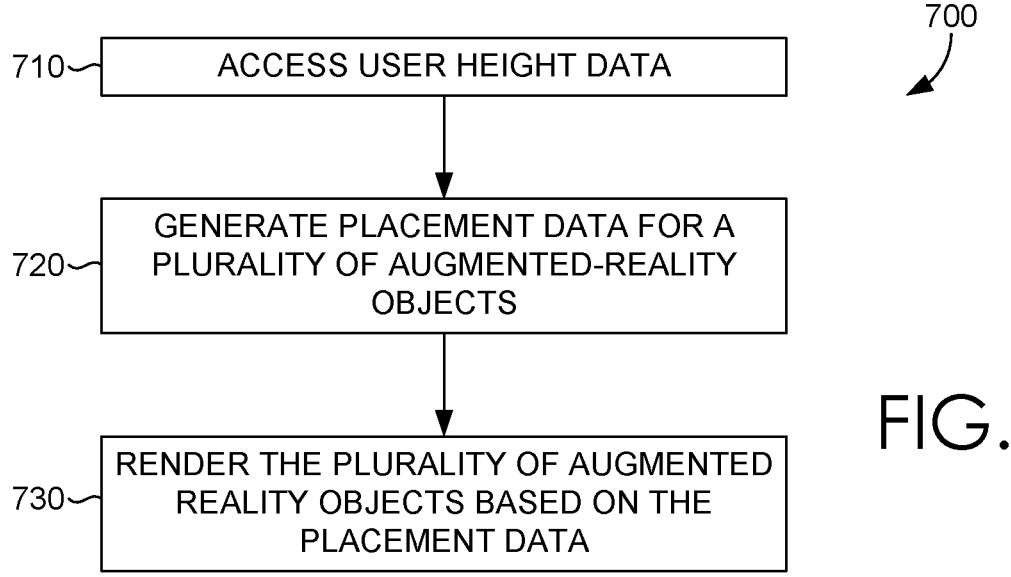
FIG. 7 is a flow diagram showing a method for user-height-based rendering of augmented reality objects, in accordance with embodiments of the present invention.

With reference to FIG. 7, a method for rendering augmented reality objects based on user height is provided. A computer storage medium can include computer-executable instructions that when executed by a processor causes the processor to perform the method. Initially at block 710, user height data is accessed. The height data is associated with a view perspective of a user of a scene-aware device. At block 720, placement data for a plurality of augmented reality object can be generated. The object component 130 can be responsible for generating the placement data for the plurality of augmented reality objects. The placement data for a first set of augmented reality objects from the plurality of augmented reality objects is based on a constraint configuration associated with the first set of augmented reality objects for rendering the first set of augmented reality objects based on user height data. The placement data for the second set of augmented reality objects from the plurality of augmented reality objects is based on the constraint configuration that is associated with the second set of augmented reality objects for not rendering the based on user height data.

Generating the placement data is further based on scene data, the scene data identifies a real-world object within a real-world scene associated with the scene data. The real-world object operates as a reference position for rendering the first set of augmented reality objects. The scene component 120 can be responsible for providing or generating scene data. A first portion of the scene data can be predetermined scene data and a second portion of the scene data can be real-time determined scene data. The first set of augmented reality objects may be associated with a shared experience rule as shared experience objects in the configuration constraints, the shared experience object is part of a shared augmented reality experience having the user as a first user and an additional user. The additional user in the shared augmented reality experience views the augmented reality object of the first user based on the user height data of the first user. In the shared augmented reality experience, the second set of augmented reality objects are rendered without reference to the user height data.

Figure 8:
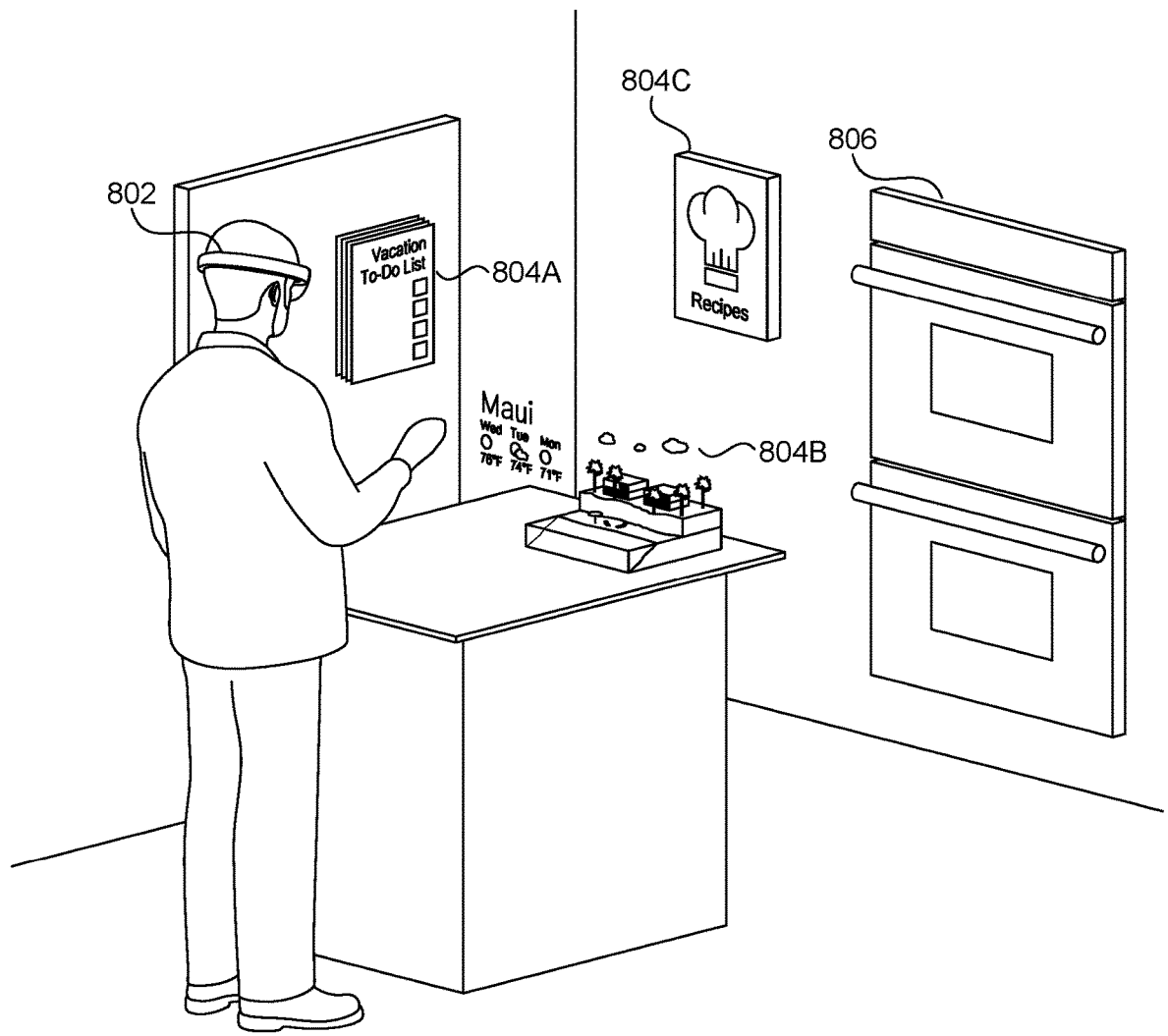
FIG. 8 is a schematic diagram showing exemplary augmented reality images of a head-mounted display device, in accordance with embodiments of the present invention.

With reference to FIG. 8, exemplary images of a head-mounted display (HMD) device 802 are depicted. Augmented reality images (e.g., 804A, 804B and 804C), comprising corresponding virtual images provided by the HMD 802 device, generally include the virtual images that appear superimposed on a background and may appear to interact with or be integral with the background 806. The background 806 is comprised of real-world scene, e.g., a scene that a user would perceive without augmented reality image emitted by the HMD 802 device. For example, an augmented reality image can include the recipe book icon 804C that appears superimposed and hanging in mid-air in front of the cooking oven or wall of the background 806.

Figure 9:
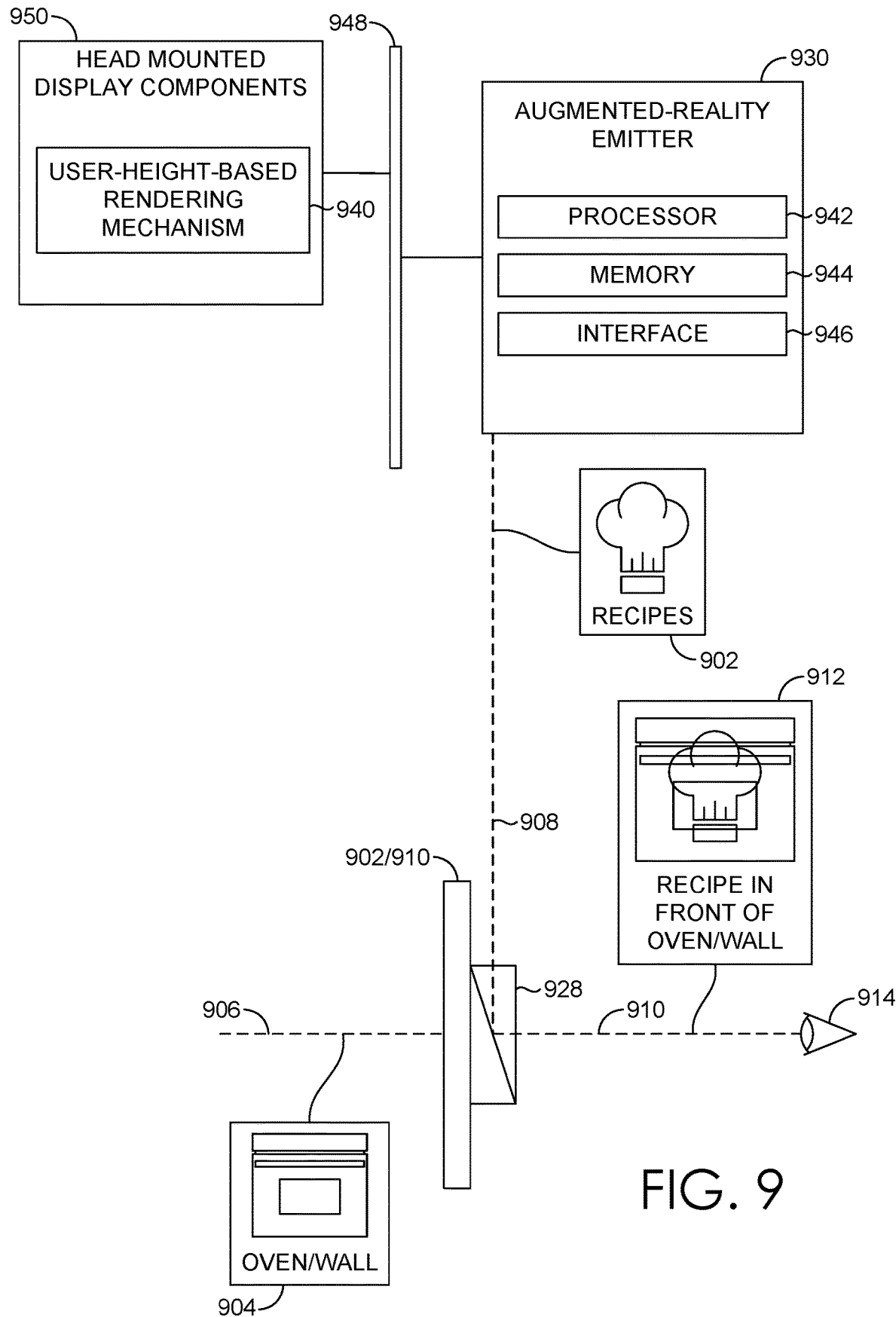
FIG. 9 is a block diagram of an exemplary head-mounted display device, in accordance with embodiments of the present invention.

Turning to FIG. 9, the HMD device 902 having the user-height-based rendering mechanism 940 is described in accordance with an embodiment described herein. The HMD device 902 includes a see-through lens 910 which is placed in front of a user's eye 914, similar to an eyeglass lens. It is contemplated that a pair of see-through lenses 910 can be provided, one for each eye 914. The lens 910 includes an optical display component 928, such as a beam splitter (e.g., a half-silvered mirror). The HMD device 902 includes an augmented reality emitter 930 that facilitates projecting or rendering the of augmented reality images. Amongst other components not shown, the HMD device also includes a processor 942, memory 944, interface 946, a bus 948, and additional HMD components 950. The augmented reality emitter 930 emits light representing a virtual image 902 exemplified by a light ray 908. Light from the real-world scene 904, such as a light ray 906, reaches the lens 910. Additional optics can be used to refocus the virtual image 902 so that it appears to originate from several feet away from the eye 914 rather than one inch away, where the display component 928 actually is. The memory 944 can contain instructions which are executed by the processor 942 to enable the augmented reality emitter 930 to perform functions as described. One or more of the processors can be considered to be control circuits. The augmented reality emitter communicates with the additional HMD components 950 using the bus 948 and other suitable communication paths.

Light ray representing the virtual image 902 is reflected by the display component 928 toward a user's eye, as exemplified by a light ray 910, so that the user sees an image 912. In the augmented-reality image 912, a portion of the real-world scene 904, such as, a cooking oven is visible along with the entire virtual image 902 such as a recipe book icon. The user can therefore see a mixed-reality or augmented-reality image 912 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The augmented reality image 902 is reflected by the display component 928 toward a user's eye, as exemplified by a light ray 910, so that the user sees an image 912. In the image 912, a portion of the real-world scene 904, such as, a cooking oven is visible along with the entire augmented reality image 902 such as a recipe book icon. The user can therefore see a mixed-reality image 912 in which the recipe book icon is hanging in front of the cooking oven in this example.

Figure 10:
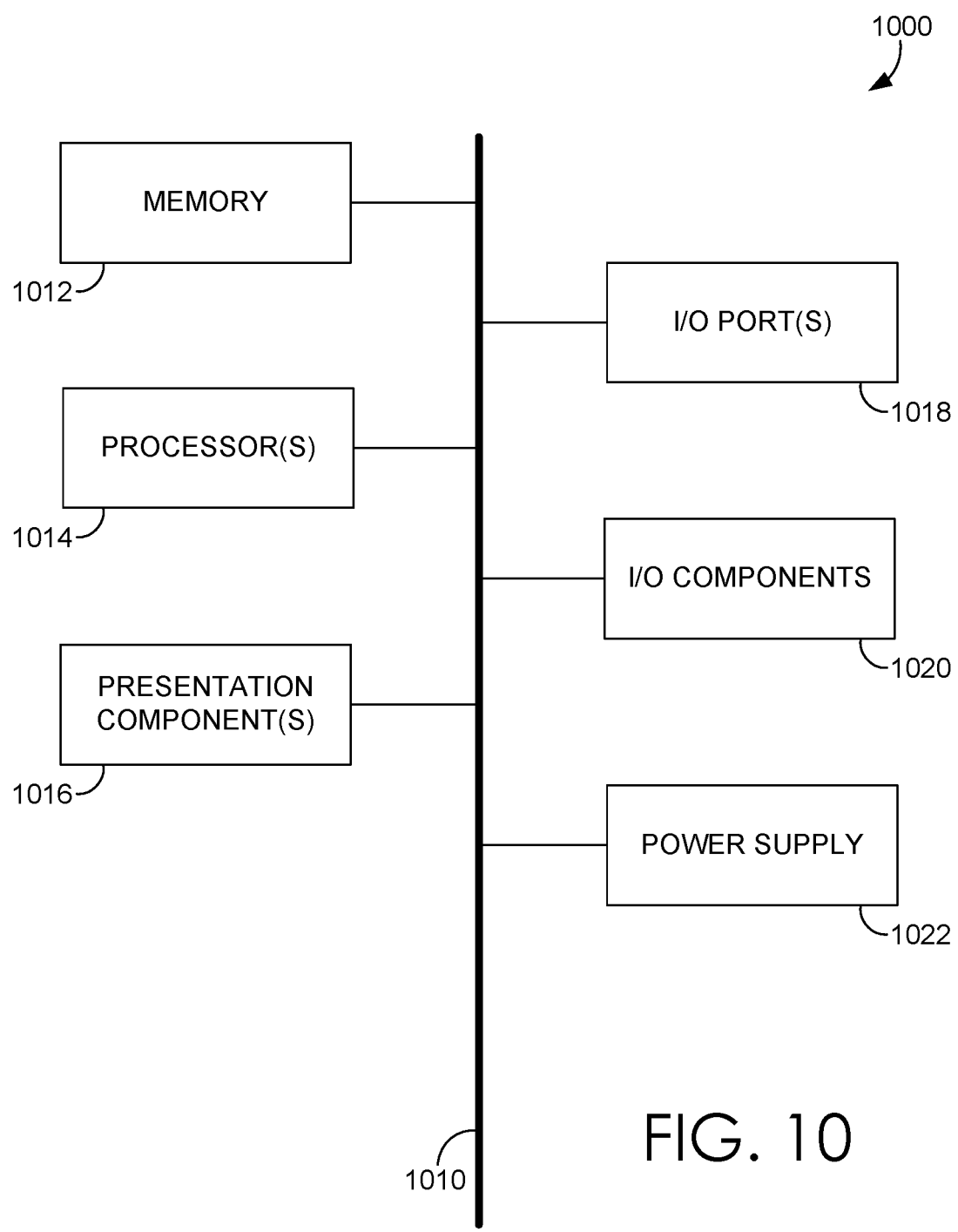
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display device as an augmented reality device; however the head-mounted display device depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display device and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for rendering augmented reality objects, the system comprising:
a user height data component configured to determine user height data that is associated with a viewing perspective from an eye level of a user of an augmented reality device, wherein the user height data is mapped to one of a plurality of height ranges, wherein each of the height ranges supports processing at least two user heights according to a same constraint configuration;
an object data component configured to generate placement data for a first augmented reality object based on a particular constraint configuration corresponding to a particular height range of the plurality of height ranges and the user height data, wherein the particular constraint configuration includes a plurality of rules that support generating placement data for rendering augmented reality objects based on user height data, wherein a first rule of the plurality of rules defines a first portion of objects that are associated with user-height-based rendering and a second portion of objects that are not associated with user-height-based rendering; and
a rendering component configured to:
render the first augmented reality object at a particular height according to the particular constraint configuration corresponding to the particular height range and the user height data that falls within the particular height range; and
render a second augmented reality object at the particular height according to the particular constraint configuration corresponding to the particular height range and different user height data that falls within the particular height range.

2. The system of claim 1, wherein a second rule of the plurality of rules identifies one or more additional objects or elements that are further defined to accommodate user height data.

3. The system of claim 1, wherein a third rule is a shared experience rule of the particular constraint configuration, the shared experience rule identifies the first augmented reality object as a shared experience object, the shared experience object is part of a shared augmented reality experience having the user as a first user and an additional user, wherein the additional user in the shared augmented reality experience views the first augmented reality object of the first user based on the user height data of the first user.

4. The system of claim 1, wherein the rendering component is further configured to:
receive adjustment data associated with placement data;
render the first augmented reality object based on the adjustment data; and
store the adjustment data for adjusting, based on the adjustment data, subsequent placement data for augmented reality objects.

5. The system of claim 1, further comprising a scene data component configured to provide access to a 3D mesh;
wherein a first portion of the 3D mesh comprises predetermined scene data of real-world objects and does not comprise augmented reality objects, and a second portion of the 3D mesh comprises real-time determined scene data;
wherein the placement data is further generated based on the user height data and the 3D mesh; and
wherein the rendering component is further configured to render the first augmented reality object based on the user height data and the 3D mesh.

6. A computer-implemented method for rendering augmented reality objects, the method comprising:
accessing user height data, wherein the user height data is associated with a viewing perspective from an eye level of a user of an augmented reality device, wherein the user height data is mapped to one of a plurality of height ranges, wherein each of the height ranges supports processing at least two user heights according to a same constraint configuration;
generating placement data for a first augmented reality object based on a particular constraint configuration corresponding to a particular height range of the plurality of height ranges and the user height data, wherein generating the placement data for the first augmented reality object is further based on a first rule of a plurality of rules that defines a first set of augmented reality objects that are associated with user-height-based rendering and a second set of augmented reality objects that are not associated with user-height-based rendering;
rendering the first augmented reality object at a particular height according to the particular constraint configuration corresponding to the particular height range and the user height data that falls within the particular height range; and
rendering a second augmented reality object at the particular height according to the particular constraint configuration corresponding to the particular height range and different user height data that falls within the particular height range.

7. The method of claim 6, wherein generating the placement data is further based on scene data, wherein the scene data identifies a real-world object within a real-world scene associated with the scene data, the real-world object operates as a reference position for rendering the first augmented reality object.

8. The method of claim 7, wherein the scene data comprises real-time determined scene data in combination with predetermined scene data for rendering the first augmented reality object.

9. The method of claim 6, wherein the first set of augmented reality objects are locally processed based on the user height data using internal components of the augmented reality device and the second set of augmented reality objects are remotely processed without user height data using external components.

10. The method of claim 6, wherein a second rule of the plurality of rules identifies one or more additional objects or elements that are further defined to accommodate user height data.

11. The method of claim 10, wherein a third rule of the plurality of rules is an animation rule that supports generating placement data for rendering animations of augmented reality objects based on user height data, the animations associated with the one or more additional objects or elements.

12. The method of claim 6, further comprising:
receiving adjustment data associated with placement data; and
rendering the first augmented reality object based on the adjustment data, wherein the adjustment data is stored for adjusting subsequent placement data for augmented reality objects.

13. One or more computer storage media having computer-executable instructions embodied thereon that, when executed, by one or more processors, causes the one or more processors to perform a method for rendering augmented reality objects based on user heights, the method comprising:
accessing user height data that is associated with a viewing perspective from an eye level of a user of an augmented reality device, wherein the user height data is mapped to one of a plurality of height ranges, wherein each of the height ranges supports processing at least two user heights according to a same constraint configuration;
generating placement data for a first augmented reality object based on a particular constraint configuration corresponding to a particular height range of the plurality of height ranges and the user height data, wherein the particular constraint configuration includes a plurality of rules that support generating placement data for rendering augmented reality objects based on user height data, wherein a first rule of the plurality of rules defines a first portion of objects that are associated with user-height-based rendering and a second portion of objects that are not associated with user-height-based rendering;
rendering the first augmented reality object at a particular height according to the particular constraint configuration corresponding to the particular height range and the user height data that falls within the particular height range; and
rendering a second augmented reality object at the particular height according to the particular constraint configuration corresponding to the particular height range and different user height data that falls within the particular height range.

14. The media of claim 13, wherein generating the placement data is further based on scene data, wherein the scene data identifies a real-world object within a real-world scene associated with the scene data, and the real-world object operates as a reference position for rendering a first set of augmented reality objects.

15. The media of claim 14, wherein the first set of augmented reality objects are associated with a shared experience rule as shared experience objects, the shared experience objects are part of a shared augmented reality experience having the user as a first user and an additional user, wherein the additional user in the shared augmented reality experience views the first augmented reality object of the first user based on the user height data of the first user.

16. The media of claim 15, wherein, in the shared augmented reality experience, a second set of augmented reality objects are rendered without reference to the user height data.

17. The media of claim 14, wherein a first portion of the scene data is predetermined scene data and a second portion of the scene data is real-time determined scene data.

* * * * *